US012744610B2

(12) United States Patent
Parrella et al.

(10) Patent No.: US 12,744,610 B2
(45) Date of Patent: Sep. 22, 2026

(54) OPPORTUNISTIC MUTING OF ALL-DIGITAL STATIONS DURING NOISY ACQUISITION

(71) Applicant: iBiquity Digital Corporation, Calabasas, CA (US)

(72) Inventors: Eugene Parrella, Calabasas, CA (US); Robert Saizan, Calabasas, CA (US)

(73) Assignee: iBiquity Digital Corporation, Columbia, MD (US)

( * ) Notice: Subject to any disclaimer, the term of this patent is extended or adjusted under 35 U.S.C. 154(b) by 324 days.

(21) Appl. No.: 18/574,868

(22) PCT Filed: Jun. 30, 2021

(86) PCT No.: PCT/US2021/039747

§ 371 (c)(1),
(2) Date: Dec. 28, 2023

(87) PCT Pub. No.: WO2023/277891

PCT Pub. Date: Jan. 5, 2023

(65) Prior Publication Data

US 2024/0297725 A1 Sep. 5, 2024

(51) Int. Cl.
*H04H 60/41* (2008.01)
*H04H 40/18* (2008.01)

(52) U.S. Cl.
CPC ............ *H04H 60/41* (2013.01); *H04H 40/18* (2013.01); *H04H 2201/18* (2013.01)

(58) Field of Classification Search
CPC ....................................................... H04H 60/41
(Continued)

(56) References Cited

U.S. PATENT DOCUMENTS 6,622,007 B2 * 9/2003 Linden .................. H04H 20/30 455/3.06
11,671,191 B2 * 6/2023 Marko .................. H04H 20/57 455/3.02
(Continued)

FOREIGN PATENT DOCUMENTS

JP 2009130745 A 6/2009
JP 4437943 B2 3/2010
WO WO-2016161517 A1 * 10/2016 ......... H04L 27/2621

OTHER PUBLICATIONS

International Search Report for PCT/US2021/039747 mailed Mar. 3, 2022. 3 pages.

*Primary Examiner* — Sam K Ahn
(74) *Attorney, Agent, or Firm* — Lerner David LLP

(57) ABSTRACT

A method performed by a radio receiver comprises: receiving digital radio broadcast (DRB) signals on respective frequency channels: acquiring a list that identifies which of the DRB signals are all-digital signals: receiving a tune command to tune to a particular DRB signal among the DRB signals; and upon determining that the particular DRB signal is an all-digital signal based on the list: playing muted audio: while playing muted audio, tuning to the particular DRB signal based on the tune command and performing digital signal acquisition of the particular DRB signal; and when the digital signal acquisition is complete, performing digital demodulation of the particular DRB signal to recover digital audio, and switching from playing muted audio to playing digital audio.

20 Claims, 5 Drawing Sheets

(58) Field of Classification Search
USPC .......................................................... 455/3.06
See application file for complete search history.

(56) References Cited

U.S. PATENT DOCUMENTS

| | | | | |
|---|---|---|---|---|
| 2004/0192191 | A1* | 9/2004 | Toporski ................ | H04H 60/74<br>455/3.06 |
| 2006/0179313 | A1* | 8/2006 | Wang ..................... | H04H 40/27<br>713/170 |
| 2018/0115378 | A1 | 4/2018 | Husmann et al. | |

* cited by examiner

400

406

| FREQUENCY | CALL LETTERS | SLOGAN | PROGRAM TYPE | HD RADIO MODE | PERFORM OPPORTUNISTIC MUTE |
|---|---|---|---|---|---|
| 99.1 | WRTI | YOUR CLASSICAL STATION | CLASSICAL | HYBRID | N |
| 99.3 | WMMR | HITS | ROCK | HYBRID | N |
| 94.1 | WIP | SPORTS ZONE | SPORTS | ALL-DIGITAL | Y |

402

FIG.4

OPPORTUNISTIC MUTING OF ALL-DIGITAL STATIONS DURING NOISY ACQUISITION

CROSS-REFERENCE TO RELATED APPLICATIONS

The present application is a national phase entry under 35 U.S.C. § 371 of International Application No. PCT/US2021/039747 filed Jun. 30, 2021, all of which are incorporated herein by reference.

TECHNICAL FIELD

The present disclosure relates to recovery and playback of audio from a digital radio broadcast signal using a radio receiver.

BACKGROUND

Digital radio broadcasting technology delivers digital audio and data services to radio receivers using existing radio bands. One type of digital radio broadcasting, referred to as in-band on-channel (IBOC) digital radio broadcasting, transmits a digital radio broadcast signal and an analog radio broadcast signal simultaneously on the same frequency using digitally modulated subcarriers or sidebands to multiplex digital information on an amplitude modulation (AM) or frequency modulation (FM) analog modulated carrier signal. HD Radio™ technology, developed by iBiquity Digital Corporation, is one example of an IBOC implementation for simulcast digital radio broadcasting and reception. With IBOC digital radio broadcasting, signals can be transmitted as: a hybrid signal (also referred to as a "hybrid waveform") including an analog modulated carrier (also referred to as an "analog signal") in combination with a plurality of digitally modulated carriers (also referred to as a "digital signal" and a "digital waveform"); or an all-digital signal (also referred to as an all-digital waveform) from which the analog signal is absent, and only the digital signal is present.

With HD Radio simulcast, a radio station transmits a hybrid signal that conveys "digital" audio in the digital signal and conveys "analog" audio in the analog signal. Because of the nature of digital radio broadcast, a hybrid radio receiver configured to process the digital and analog signals of the hybrid signal, concurrently, can take several seconds to acquire the digital signal before it can be demodulated to recover the digital audio. During the digital signal acquisition period, the hybrid radio receiver demodulates the analog signal to recover analog audio and plays the analog audio through audio-playback components (e.g., a loudspeaker and the like). After digital signal acquisition is complete, the hybrid radio receiver demodulates the digital signal to recover the digital audio. Then, a relatively seamless audio blend or transition from playing the analog audio to playing the digital audio occurs.

In addition, HD Radio may operate in several service modes that may employ all-digital signals, with no analog signal; these service modes are intended for future use and offer an option in which additional digital carriers replace the analog signal in a portion of a frequency channel normally occupied by the analog signal.

While acquiring an all-digital signal, the hybrid radio receiver may employ conventional audio playback, which initially plays objectionable analog audio noise for up to 0.5 seconds (s) during the all-digital signal acquisition. This occurs when the hybrid radio receiver performs analog demodulation on a presumed analog signal, but the analog signal does not exist. Thus, the analog demodulation produces analog audio noise.

BRIEF DESCRIPTION OF THE DRAWINGS

FIG. 4 is an illustration of a digital radio broadcast list or "mute list" used by the hybrid radio receiver to make opportunistic muting decisions.

DESCRIPTION OF EXAMPLE EMBODIMENTS

Example Embodiments

According to embodiments presented herein, a hybrid radio receiver implements an audio playback technique referred to as "opportunistic muting" that overcomes the above-described problems, and provides seamless audio playback for all-digital signals and hybrid signals. The embodiments may also be referred to as "selective audio muting."

According to the embodiments, the hybrid radio receiver acquires advance knowledge of digital radio broadcast/broadcasting (DRB) signals within range, or likely to be in range, of the hybrid radio receiver. The advance knowledge may include a DRB list that identifies which DRB signals are all-digital signals, and which DRB signals are hybrid signals. Subsequently, when the hybrid radio receiver tunes to a particular DRB signal responsive to user input (e.g., station or channel selection), the hybrid radio receiver consults the DRB list to determine whether the DRB signal is an all-digital signal or a hybrid signal.

When the DRB signal is an all-digital signal, the hybrid radio receiver immediately selectively mutes audio to produce muted audio. During digital signal acquisition of the DRB signal (also referred to as "digitally acquiring" the DRB signal), the hybrid radio plays the muted audio, instead of audio noise. When digital signal acquisition is complete (i.e., the DRB signal is "digitally acquired") and digital demodulation starts, the hybrid radio receiver switches/transitions from playing the muted audio to playing digital audio recovered by the digital demodulation.

Alternatively, when the DRB signal is not an all-digital signal, i.e., when the DRB signal is a hybrid signal, the hybrid radio receiver initially plays analog audio without the mute (i.e., unmuted analog audio) during digital signal acquisition. After digital signal acquisition and when digital demodulation starts, the hybrid radio receiver switches/transitions to playing digital audio.

Figure 1:
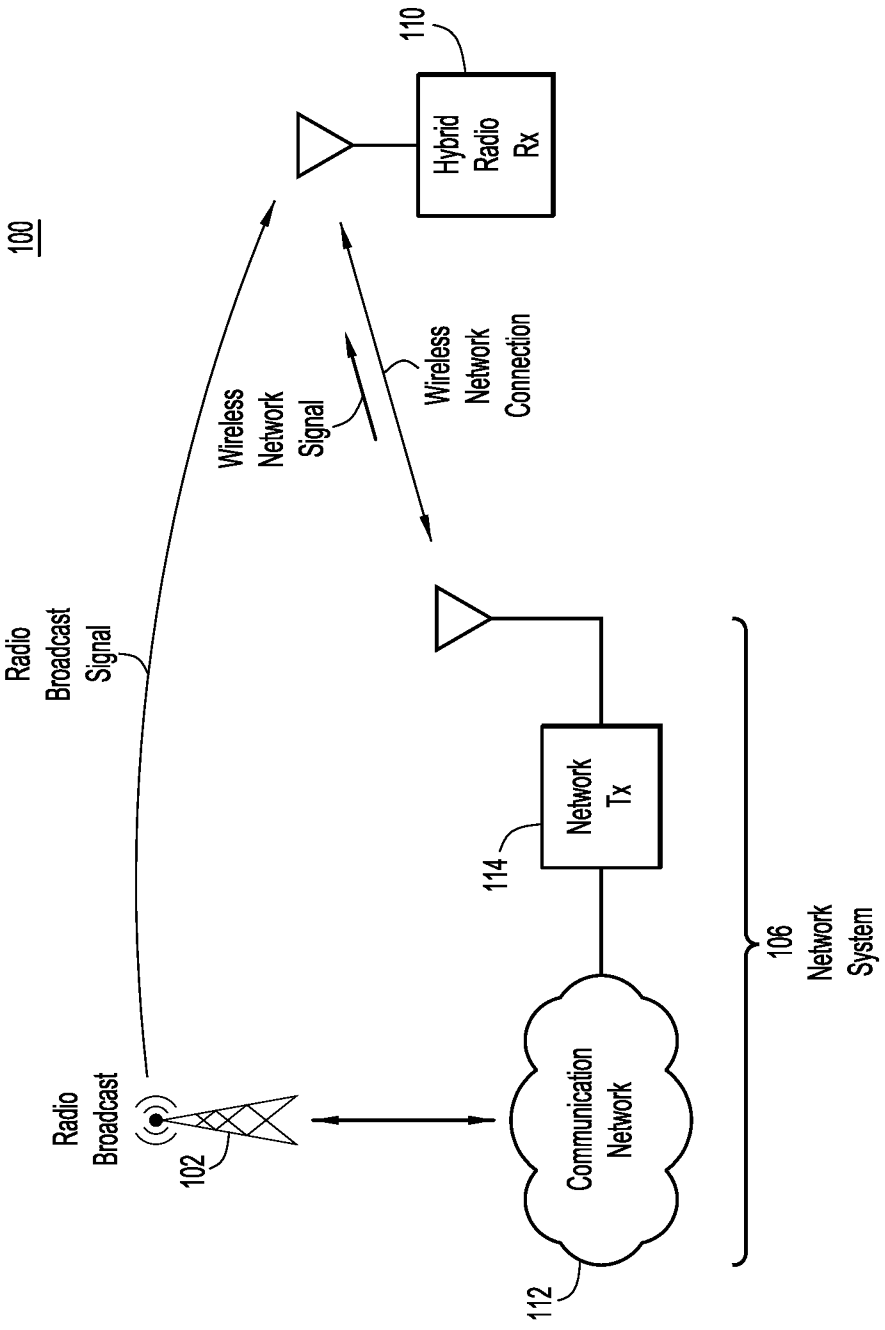
FIG. 1 is a high-level block diagram of an example digital radio broadcast system in which embodiments directed to opportunistic muting may be implemented.

FIG. 1 is a high-level block diagram of an example digital radio broadcast (DRB) system 100. DRB system 100 includes a DRB station 102 to transmit DRB signals on respective spaced frequencies spanning a broadcast radio band (e.g., the Very High Frequency (VHF) radio band), a network system 106 to transmit wireless network signals, and a mobile/portable or fixed hybrid radio receiver (Rx) 110 configured to implement the opportunistic muting. In the example of FIG. 1, DRB station 102 may generate and transmit the DRB signals in accordance with HD Radio services and protocols. The DRB signals may comprise IBOC signals. While only one DRB station is shown in FIG. 1, a broadcast area typically includes a large number of such stations that collectively transmit multiple DRB signals.

The multiple DRB signals may include some all-digital signals and some hybrid signals. An all-digital signal (also referred to as a "DRB signal in an all-digital format") is a digital signal modulated to convey "digital" audio with no analog modulated carrier. As used herein, the term "digital" audio indicates the audio is conveyed by the digital signal. The digital signal may be modulated to convey the digital audio using orthogonal frequency division multiplexing (OFDM), for example. A hybrid signal (also referred to as a "DRB signal in a hybrid format") includes digital and analog signals that occupy a frequency channel simultaneously. The digital signal of the hybrid signal is modulated to convey digital audio similar to an all-digital signal, and the analog signal of the hybrid signal is modulated to convey "analog" audio. As used herein, the term "analog" audio indicates the audio is carried by the analog signal. The analog signal may be modulated to convey the analog audio using FM or AM techniques. The digital audio and analog audio may also be referred to respectively as "first audio" and "second audio," for example.

DRB station 102 may be configured to transmit DRB signals in accordance with various service modes, which dictate operational configuration and performance. For example, HD Radio service modes include primary service modes for FM, including MP1-MP6 and MP11, primary service modes for AM, including MA1 and MA3, and secondary services modes MS1-MS4. DRB station 102 encodes each digital signal (e.g., the all-digital signal or the digital signal/portion of a hybrid signal) with information indicative of a service mode (e.g., MP5, MP6, and so on) associated with the digital signal. As described below, hybrid radio receiver 110 recovers the service mode from the digital signal, during its acquisition. Service modes MP1-MP 4, MP11, and MA1 employ/apply to hybrid signals that convey digital and analog audio, although the digital and analog audio may be time-shifted relative to each other. On the other hand, service modes MP5, MP6, and MA3 may employ/apply to all-digital signals.

Network system 106 includes a communication network 112 communicatively coupled to network transmitter (Tx) 114 to transmit a wireless network signal. Communication network 112 may include one or more wide area networks (WANs), such as the Internet, and one or more local area networks (LANs), content programming producers, cellular networks, WiFi networks, and the like. Examples of network transmitter 114 may include a cellular tower associated with cellular networks, a transmitter that operates in accordance with the IEEE 802.11 suite of protocols (e.g., WiFiR), and so on. Network transmitter 114 receives network data in the form of data packets from communication network 112. Network transmitter 114 transmits the wireless network signal (e.g., a cellular or WiFi signal) that includes the data packets to hybrid radio receiver 110, typically over the wireless network connection (e.g., a wireless Internet Protocol (IP) connection) with the hybrid radio receiver.

Hybrid radio receiver 110 is configured to receive and process the DRB signals transmitted by DRB stations (such as DRB station 102), and to receive and process the wireless network signals. Hybrid radio receiver 110 implements opportunistic muting to ensure audio playback transitions from initially muted audio to digital audio recovered from a DRB signal under certain conditions described herein to provide a seamless listening experience, whether the DRB signal is in an all-digital signal or a hybrid signal.

Figure 2:
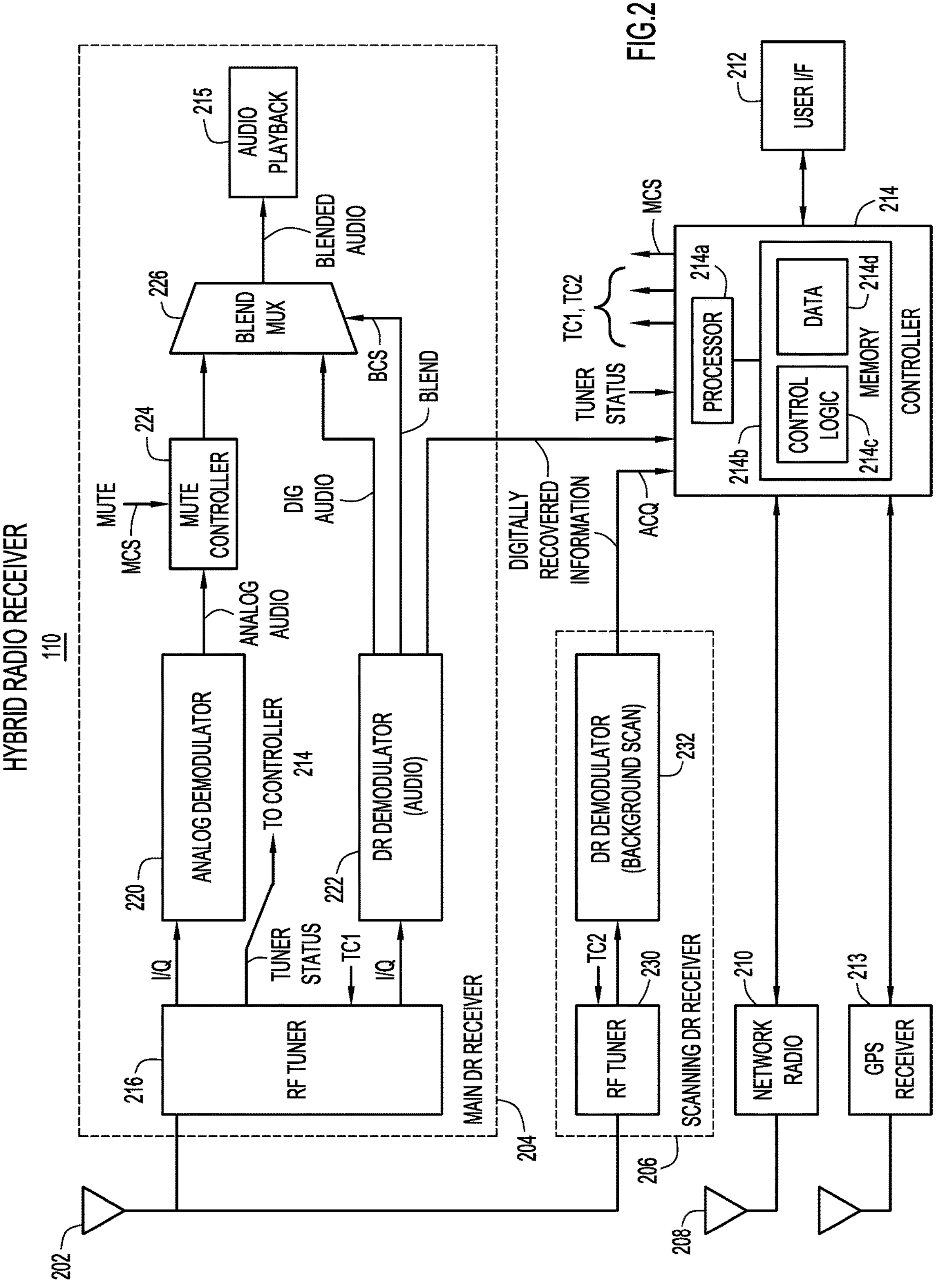
FIG. 2 is a block diagram of an example hybrid radio receiver of the digital radio broadcast system and in which the opportunistic muting may be implemented.

FIG. 2 is a functional block diagram of hybrid radio receiver 110, according to an embodiment. Hybrid radio receiver 110 includes an antenna 202 coupled to a main digital radio (DR) receiver 204 (which is a hybrid radio receiver in the example of FIG. 2) and a scanning digital radio receiver 206, an antenna 208 coupled to a network radio 210, user interface (I/F) components 212, a Global Positioning Receiver (GPS) receiver 213, and a receiver controller (or simply "controller") 214 communicatively coupled to and configured to control the aforementioned receiver components, generally, and responsive to user inputs/commands from the user interface components. The aforementioned receiver components will be described first, more or less separately, to provide an understanding of how hybrid radio receiver 110 operates, generally. Then, interaction among the receiver components to implement opportunistic muting will be described in connection with FIGS. 3 and 4.

User interface components 212 may include a control panel (e.g., a touchscreen display, keypad, dials, control buttons, and so on) through which a user interacts with and controls hybrid radio receiver 110. In an example, user interface components 212 receive input from a user (e.g., radio station tune commands), convert the input to command/control signals (e.g., frequency tune commands), and forward the command/control signals to controller 214. Controller 214 controls hybrid radio receiver 110 according to the command/control signals.

GPS receiver 213 tracks a location of the GPS receiver/hybrid radio receiver 110, and provides the location to controller 214.

Controller 214 provides overall control of hybrid radio receiver 110, and implements embodiments presented herein. Controller 214 is coupled to and communicates with the aforementioned receiver components over respective interfaces with the receiver components. Controller 214 includes processor(s) 214*a* and a memory 214*b*. Memory 214*b* stores control software 214*c* (referred as "control logic"), that when executed by the processor(s) 214*a*, causes the processor(s), and more generally, controller 214, to perform the various operations described herein for hybrid radio receiver 110. The processor(s) 214*a* may be a microprocessor or microcontroller (or multiple instances of such components). The memory 214*b* may include read only memory (ROM), random access memory (RAM), magnetic disk storage media devices, optical storage media devices, flash memory devices, electrical, optical, or other physically tangible (i.e., non-transitory) memory storage devices. Controller 214 may also be discrete logic embedded within an IC device.

Thus, in general, the memory 214*b* may comprise one or more tangible (non-transitory) computer readable storage media (e.g., memory device(s)) encoded with software or firmware that comprises computer executable instructions. For example, control software 214*c* includes logic to implement operations of seamless audio playback performed by the controller 214 and, more generally, hybrid radio receiver 110. Thus, control software 214*c* implements the various methods/operations described herein. Memory 214*b* also includes data 214*d* generated and used by control software 214*c*.

Main digital radio receiver 204 includes a first radio frequency (RF) tuner 216, an analog demodulator 220 to recover analog audio from a DRB signal, a first digital radio demodulator 222 to recover digital audio from a DRB signal, a mute controller 224 to selectively mute the analog audio responsive to a mute control signal MCS asserted by controller 214, audio-playback components 215 (which may be integrated with or separate from user interface components 212), and a blend multiplexer 226 to select the analog audio or the digital audio for audio playback (i.e., for playing) through the audio-playback components responsive to a blend control signal BCS asserted by the digital radio demodulator.

Antenna 202 provides DRB signals received by the antenna to RF tuner 216. Responsive to a tune command TC1 from controller 214, RF tuner 216 tunes to a frequency channel (and thus a DRB signal that occupies that frequency channel) indicated by the tune command. Once RF tuner 216 tunes to the frequency channel, the RF tuner frequency down-converts and digitizes the DRB signal on the frequency channel to produce (i) a first digitized, complex, baseband signal (referred to simply as a "complex baseband signal") including quadrature I and Q samples representative of the DRB signal, and (ii) a second complex baseband signal including quadrature I and Q samples representative of the DRB signal. RF tuner 216 concurrently provides the first complex baseband signal to analog demodulator 220 and the second complex baseband signal to digital radio demodulator 222. RF tuner 216 also generates tuner status, and provides the tuner status to controller 214. The tuner status may indicate "tune complete" when RF tuner 216 has finished tuning to a frequency channel responsive to tune command TC1.

Analog demodulator 220 and digital radio demodulator 222 operate on their respective complex baseband signals in parallel, i.e., concurrently. Because each complex baseband signal is representative of the DRB signal, the ensuing description does not distinguish between a given complex baseband signal and the DRB signal. Analog demodulator 220 performs analog demodulation of the DRB signal (i.e. the complex baseband signal) after a brief analog acquisition period (e.g., 0.1 s), to recover analog audio. Analog demodulator 220 assumes the presence of an analog signal in the DRB signal. Thus, when the DRB signal is a hybrid signal, the analog demodulation recovers meaningful analog audio. On the other hand, when the DRB signal is an all-digital signal with no accompanying analog signal, the analog audio is essentially audio noise. Analog demodulator 220 provides the analog audio to a first input of blend multiplexer 226 through mute controller 224.

Mute controller 224 selectively mutes and unmutes the analog audio responsive to alternative mute and unmute states of mute control signal MCS, as asserted by controller 214. More specifically, controller 214 asserts mute control signal MCS to control mute controller 224 to implement (i) opportunistic muting, and (ii) "tune" muting while RF tuner 216 is tuning to a channel frequency responsive to tune command TC1, i.e., from a time when the controller issues tune command TC1 until the tuner status indicates tune complete. In an example in which the analog audio comprises a pulse code modulation (PCM) signal, mute controller 224 mutes the analog audio by setting the PCM signal to a minimum amplitude (e.g., PCM value=0), to produce muted analog audio. To unmute the analog audio, mute controller 224 does not adjust the values of the PCM signal, in which case mute controller 224 essentially operates as a "pass-through."

While analog demodulator 220 performs the above-described operations, digital radio demodulator 222 performs a relatively long or extended digital signal acquisition on the DRB signal. Digital signal acquisition recovers symbol timing and digital carrier frequency offsets for digitally demodulating the DRB signal. Digital signal acquisition also recovers service information, such as service modes, from the DRB signal. In an example, digital signal acquisition may take approximately 0.4-0.5 s, or even longer. In an embodiment, digital radio demodulator 222 mutes digital audio during digital signal acquisition, and provides the muted digital audio to a second input of blend multiplexer 226. When digital signal acquisition is complete, digital radio demodulator 222 sends an acquisition (ACQ) complete indicator ACQ to controller 214, along with other digitally recovered information, such as a service mode and secondary channel indicator, indicating a hybrid or an all-digital signal, and starts digitally demodulating the DRB signal, to recover digital audio. Digital radio demodulator 222 provides the (unmuted) digital audio to the second input of blend multiplexer 226. In addition, digital radio demodulator 222 derives blend control signal BCS, and provides it to a selection control input of blend multiplexer 226, as described below.

Blend multiplexer 226 selectively outputs the analog audio (e.g., second audio) or the digital audio (e.g, first audio) as audio for playback (also referred to as "blended audio") responsive to first and second states of blend control signal BCS asserted by digital radio demodulator 222, and provides the audio for playback to audio-playback components 215. Audio-playback components play the audio provided by blend multiplexer 226. Audio-playback components 215 may include loudspeakers, Bluetooth or other wireless audio playback components, audio jacks/ports for earphones, and the like.

Scanning digital radio receiver 206 includes a second RF tuner 230 tuned by a tune command TC2 asserted by controller 214, and a second digital radio demodulator 232. Second RF tuner 230 and second digital radio demodulator 232 are configured similarly to first RF tuner 216 and first digital radio demodulator 222, respectively, except that the second digital radio demodulator may not recover digital audio. Controller 214 employs scanning digital radio receiver 206 to perform a background scan of the radio band, to detect/acquire, identify, and characterize DRB signals that are in range of hybrid radio receiver 110. Under control of controller 214, scanning digital radio receiver 206 steps through the frequency channels of the radio band in sequence, detects/acquires the DRB signals that occupy the frequency channels, recovers service information from the acquired DRB signals (e.g., service modes of corresponding ones of the DRB signals), and provides the service information to controller 214. Controller 214 compiles the service information into a radio station or channel list having entries that correlate the service information to the frequency channels/DRB signals to which the service information pertains, as described later in connection with FIGS. 3 and 4.

Network radio 210 includes a wireless network interface (I/F) and a packet processor (not shown in FIG. 2). The wireless network I/F establishes a bi-directional wireless network connection (e.g., an IP connection, cellular connection, or other type of wireless data connection) with a communication network through antenna 208. The wireless network I/F may include a Wi-Fi interface component and/or a cellular interface component for transmitting and receiving wireless RF signals, for example. In a receive direction, the wireless network I/F receives data packets from the communication network, and passes the data packets to the packet processor. The packet processor decodes the data packets to recover their data, and provides it to controller 214. In a transmit direction, network radio 210 wirelessly transmits data packets to the communication network via antenna 208.

In summary, during digital signal acquisition of the DRB signal, analog demodulator 220 produces (i) analog audio noise when the DRB signal is an all-digital signal, and (ii) analog audio when the DRB signal is a hybrid signal that conveys digital and analog audio. To avoid initially playing the analog audio noise, controller 214 relies on advance knowledge of the DRB signals, mute controller 224, and blend multiplexer 226 to selectively mute the audio, i.e., to implement opportunistic muting, as described below.

Figure 3:
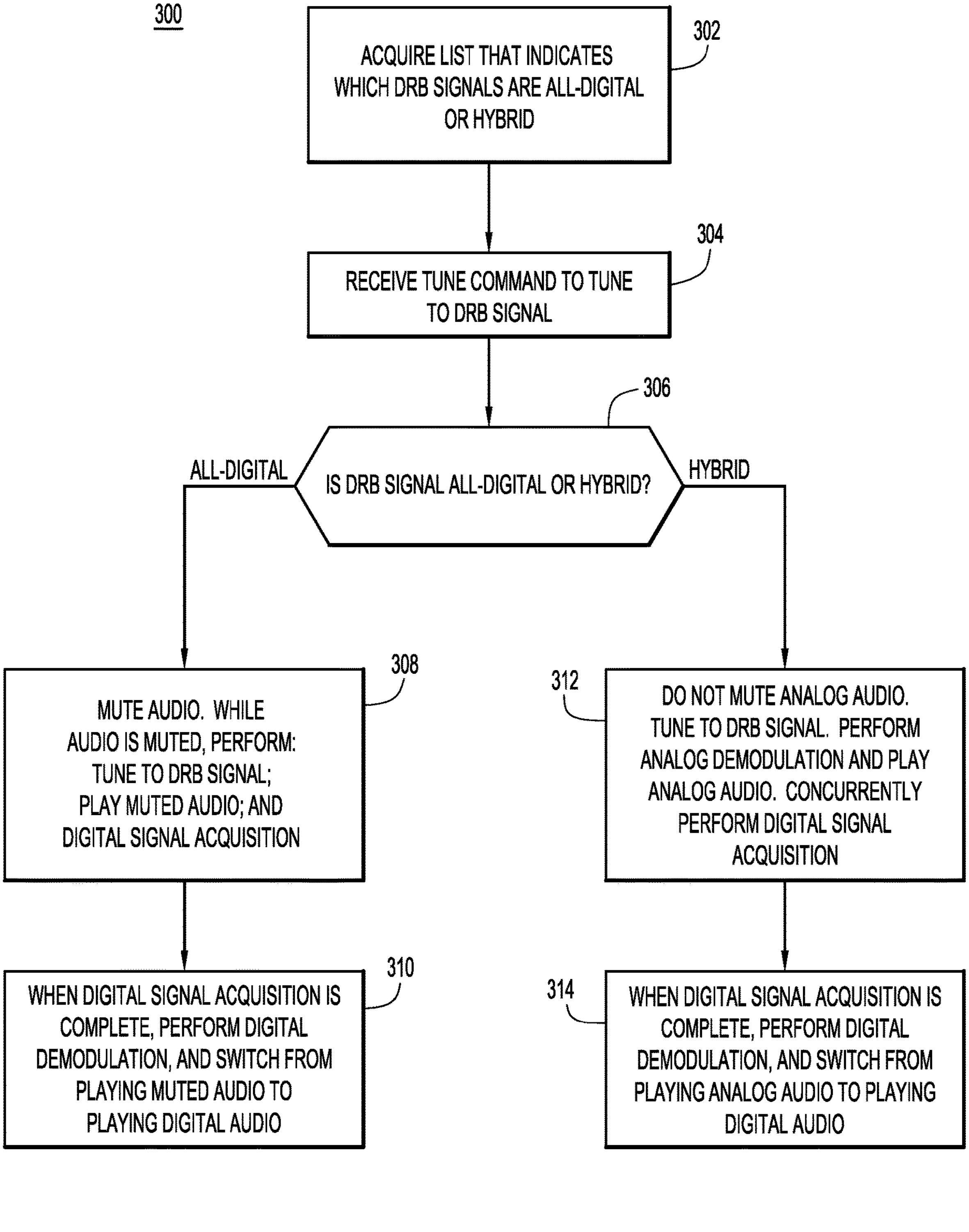
FIG. 3 is a flowchart of an example method of the opportunistic muting performed by the hybrid radio receiver.

FIG. 3 is a flowchart of an example method 300 of opportunistic muting for seamless audio playback, performed by hybrid radio receiver 110 while operating in digital radio broadcast system 100, for example. Method 300 is performed collectively by controller 214 and other receiver components of hybrid radio receiver, including main digital radio receiver 204, scanning digital radio receiver 206, network radio 210, and GPS receiver 213. That is, controller 214 interacts with the other receiver components to implement method 300. Method 300 is described also with continued reference to FIG. 2.

At 302, controller 214 performs operations to acquire advance knowledge, i.e., a priori information, characterizing DRB signals within range, or likely to be in range, of hybrid radio receiver 110. That is, controller 214 acquires a DRB list (also referred to simply as a "list") that identifies which of the DRB signals are all-digital signals and which of the DRB signals are hybrid signals. Alternatively, the list may only indicate which of the DRB signals are all-digital signals. The list may be in the form of a station/channel guide, or a "living list" of frequency channels/DRB signals that are available to hybrid radio receiver 110. As described below, controller 214 uses the DRB list to selectively mute audio for DRB signals. Thus, the list may also be referred to as a "mute list."

In a first example, controller 214 may acquire the list by creating the list using scanning digital radio receiver 206, as described above. That is, scanning digital radio receiver 206 sequentially scans frequency channels of the radio band for DRB signals. When a DRB signal is detected, digital radio demodulator 232 recovers service information, such as a service mode, and other signal information, from the detected DRB signal. That is, digital radio demodulator 232 tunes to, and acquires, the DRB signals to recover their service modes. Digital radio demodulator 232 forwards/provides the recovered information to controller 214. Over time, controller 214 correlates the frequency channels with the information from the DRB signals, and compiles the correlated information into the list as the "advance knowledge."

In a second example, DRB station 102 encodes the list into a data portion (e.g., protocol data units (PDUs)) of the DRB signal, and then transmits the DRB signal with its encoded list. Digital radio demodulator 222 or digital radio demodulator 232 recovers the list when the DRB signal is acquired/detected, and provides the list to controller 214.

In a third example, controller 214 acquires the list using network radio 210. In the third example, a data service accessible through network system 106 maintains information for the list correlated to geographic location (e.g., maintains different lists of DRB station information corresponding to different geographical locations/areas). Controller 214 receives a location from GPS receiver 213, and sends a data request for the list to the data service over a wireless network connection. The data request includes the location. Responsive to the location in the request, the data service access a location-specific list, encodes that list into data packets, and transmits a response including the data packets to network radio 210 over the wireless network connection. Network radio 210 forwards the data packets that carry the list to controller 214, and controller 214 recovers the list from the data packets. Thus, in both the second and third examples, controller 214 acquires the list by receiving the list from an external source.

In a fourth example, controller 214 may generate the list, over time, as a history/record of all of the all-digital DRB signals (e.g., all-digital DRB stations) to which hybrid radio receiver 110 has tuned (e.g., under user control) and acquired digitally, previously. The record represents a historical list of all of the all-digital DRB signals that may be received by hybrid radio receiver 110. This approach is useful when hybrid radio receiver 110 does not have a scanning receiver or a network connection, and has not received a list of all-digital DRB signals carried by a DRB signal.

Controller 214 may acquire multiple lists at any given time using multiple techniques described above. For example, controller 214 may acquire (i) a first list over-the-air using network radio 210 or the DRB signal that carries the first list, and (ii) a second list using the scanning digital radio receiver 206. Controller 214 may then combine/compile the first list and the second list into a combined list that lists only DRB stations that are actually received by hybrid radio receiver 110.

As a background operation, as hybrid radio receiver 110 moves from location to location over time, controller 214 periodically acquires new/updated lists using the above-described techniques.

FIG. 4 is an illustration of an example list 400 in the form of a station guide. List 400 includes entries or rows 402 corresponding to different frequency channels or stations. The frequency channels correspond to respective DRB signals that occupy the frequency channels. Each row characterizes the station/DRB signal for the given frequency channel. For example, each row/entry may include a frequency, station identification information (e.g., station call letters), a slogan, a program type, and an indication that the DRB signal that occupies the frequency is an all-digital signal or a hybrid signal, as shown in FIG. 4. The indication may additionally or alternatively specify a service mode for the DRB signal (which is not shown in FIG. 4). The service mode may be an HD radio mode, such as MP1, MP2, MP5, and MP6, for example. Generally, opportunistic muting of audio would be applied to HD radio all-digital service modes MP5, MP6, and MA3, and future service modes, when associated with all-digital DRB signals. To that end, each row may also include a (Yes/No) mute indicator or flag 406 that indicates whether to apply opportunistic muting of audio. FIG. 4 is provided as an example, only. It is understood that the list may be provided in any known or hereafter developed structure/format, such as a table, linked list, array, and so on, that may be searched based on identifying information, such as an index, a frequency, a station identifier, a preset indicator, and so on.

Returning to FIG. 3, at 304, controller 214 receives an instruction (e.g., a tune command) from user interface components 212 to tune to a frequency channel/station carrying a DRB signal.

At 306, upon receiving the tune command, controller 214 determines whether opportunistic muting of audio is to be applied to the DRB signal using mute controller 224. To do this, controller 214 searches the entries of the list acquired at 302 for the DRB signal (e.g., which may be identified by its frequency) to determine whether the DRB signal is an all-digital signal (i.e., is in the all-digital format) or a hybrid signal. For example, controller 214 uses a channel frequency associated with the tune command as an index to locate an entry in the list for the DRB signal, and then parses the fields of the entry for an indication of whether the DRB signal is all-digital or hybrid. Upon determining that the DRB signal is the all-digital signal based on the search of the list, flow proceeds to 308. Upon determining that the DRB signal is not the all-digital signal based on the search of the list, i.e. is a hybrid signal, flow proceeds to 312.

At 308, controller 214 causes mute controller 224 to mute analog audio to produce muted analog audio, and digital radio demodulator 222 causes blend multiplexer 226 to select the muted analog audio for playback. This results in playing muted audio from mute controller 224 through audio-playback components 215. While playing muted audio, hybrid radio receiver 110 performs the following operations, concurrently:

a. RF tuner 216 tunes to the frequency channel of the DRB signal under control of controller 214.
b. Analog demodulator 220 may produce analog audio noise, which is muted by mute controller 224
c. Digital radio demodulator 222 starts digital signal acquisition on the DRB signal.

At 310, when digital signal acquisition is complete, the following operations are performed:

a. Digital radio demodulator 222 performs digital demodulation to recover digital audio, and causes blend multiplexer 226 to select the digital audio for playback instead of the muted audio. That is, blend multiplexer 226 is controlled to switch from playing the muted audio to playing the digital audio.
b. Digital radio demodulator 222 sends the ACQ signal to controller 214 to inform the controller that the DRB signal is acquired.
c. Responsive to the ACQ signal, controller 214 causes mute controller 224 to unmute the analog audio.

The foregoing operations result in a seamless transition from playing muted (analog) audio during digital signal acquisition to playing digital audio when digital demodulation starts.

Another approach modifies operations 308 and 310 to rely, additionally, on digital radio demodulator 222 to implement opportunistic muting. In that case, while digital radio demodulator 222 performs digital signal acquisition on the DRB signal, the digital radio demodulator automatically mutes digital audio to produce muted digital audio, provides the muted digital audio to blend multiplexer 226, and causes blend multiplexer 226 to select the muted digital audio for playback. When the DRB signal is acquired, digital radio demodulator 222 provides unmuted digital audio recovered from the DRB signal to blend multiplexer 226 instead of the muted digital audio, and continues to cause the blend multiplexer to select the digital audio for playback. This approach results in a seamless transition from playing muted digital audio during digital signal acquisition to playing (unmuted) digital audio when digital demodulation starts. In yet another approach, digital radio demodulator 222 asserts blend control signal BCS to select muted digital audio under control of controller 214, to perform opportunistic muting and provide the above-described seamless transition. Therefore, whether controller 214 and/or digital radio demodulator 222 implement opportunistic muting, the result is the same, i.e., a seamless transition from playing muted audio (which may be muted analog audio or muted digital audio) during digital signal acquisition to playing digital audio when digital demodulation starts.

At 312, controller 214 causes mute controller 224 to unmute analog audio, and digital radio demodulator 222 causes blend multiplexer 226 to select the unmuted analog audio (i.e., the analog audio) for playback. RF tuner 216 tunes to the DRB signal under control of controller 214, and analog demodulator 220 initially performs analog demodulation of the DRB signal (i.e., analog demodulation of the analog carrier of the hybrid signal) to recover analog audio. Mute controller 224 and blend multiplexer 226 continue playing the analog audio. Concurrently, digital radio demodulator 222 performs digital signal acquisition on the DRB signal.

At 314, when the digital signal acquisition is complete, digital radio demodulator 222 performs digital demodulation of the DRB signal to recover the digital audio, and causes blend multiplexer 226 to switch from playing the (unmuted) analog audio to playing the digital audio.

Figure 5:
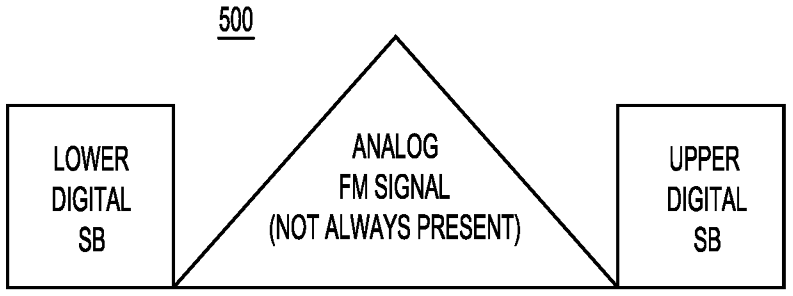
FIG. 5 is an illustration of an example power spectrum for a hybrid signal.

FIG. 5 is an illustration of an example power spectrum 500 for a hybrid signal. A center portion of spectrum 500 comprises an analog FM signal, while upper and lower portions or sidebands (SBs) of the spectrum comprise a digital signal. Spectrum 500 represents a generalized spectral mapping for each of service modes MP1-MP4 in HD Radio. On the other hand, the central analog FM signal may be disabled (i.e. may not be present) for service modes MP5 and MP6, resulting in an all-digital signal.

Figure 6:
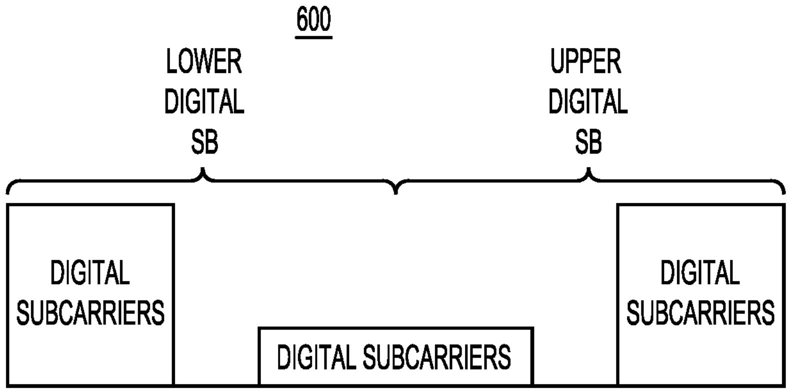
FIG. 6 is an illustration of an example power spectrum for an FM all-digital signal.

FIG. 6 is an illustration of an example power spectrum 600 for an FM all-digital signal. The all-digital signal is constructed by disabling the central analog signal, and replacing it with additional digital subcarriers.

By way of example, embodiments presented herein are performed by a hybrid radio receiver that includes an analog demodulator, a digital radio demodulator, and a controller. More generally, the embodiments may be performed by a radio receiver that is a non-hybrid radio receiver that includes a digital radio demodulator and a controller, but no analog demodulator. The hybrid radio receiver and the non-hybrid radio receiver may each be referred to more generally as a "radio receiver."

In summary, in one embodiment, a method performed by a radio receiver is provided, comprising: receiving digital radio broadcast (DRB) signals on respective frequency channels; acquiring a list that identifies which of the DRB signals are all-digital signals; receiving a tune command to tune to a particular DRB signal among the DRB signals; and upon determining that the particular DRB signal is an all-digital signal based on the list: playing muted audio; while playing muted audio, tuning to the particular DRB signal based on the tune command and performing digital signal acquisition of the particular DRB signal; and when the digital signal acquisition is complete, performing digital demodulation of the particular DRB signal to recover digital audio, and switching from playing muted audio to playing digital audio.

In another embodiment, an apparatus in the form of a hybrid radio receiver is provided comprising: a digital radio receiver to receive and process radio broadcast signals; and a controller to control the digital radio receiver, and configured to perform: acquiring a list identifying which of the radio broadcast signals are all-digital signals and which of the radio broadcast signals are hybrid signals; receiving input to tune to a particular radio broadcast signal among the radio broadcast signals; and upon determining that the particular radio broadcast signal is an all-digital signal based on the list, controlling the digital radio receiver to perform: playing muted audio; while playing muted audio, tuning to the particular radio broadcast signal and performing digital signal acquisition of the particular radio broadcast signal; and when the digital signal acquisition is complete, performing digital demodulation of the particular radio broadcast signal to recover digital audio, and switching from playing muted audio to playing digital audio.

In yet another embodiment, a non-transitory computer readable medium is provided. The medium is encoded with instructions that, when executed by a processor of a digital radio receiver configured to receive and process digital radio broadcast (DRB) signals, cause the processor to perform: acquiring a list identifying which of the DRB signals are all-digital signals; receiving input to tune to a particular DRB signal among the DRB signals; and upon determining that the particular DRB signal is an all-digital signal based on the list, controlling the digital radio receiver to perform: playing muted audio; while playing muted audio, tuning to the particular DRB signal and performing digital signal acquisition of the particular DRB signal; and when the digital signal acquisition is complete, performing digital demodulation of the particular DRB signal to recover digital audio, and switching from playing muted audio to playing digital audio.

Note that in this Specification, references to various features (e.g., elements, structures, modules, components, logic, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations described with reference to the preceding figures illustrate only some of the possible scenarios that may be executed by one or more entities and components discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

Additionally, unless expressly stated to the contrary, the terms 'first', 'second', 'third', etc., are intended to distinguish the particular nouns they modify (e.g., element, condition, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method performed by a radio receiver, comprising:
- receiving digital radio broadcast (DRB) signals on respective frequency channels;
- acquiring a list that identifies which of the DRB signals are all-digital signals;
- receiving a tune command to tune to a particular DRB signal among the DRB signals; and
- determining that the particular DRB signal is an all-digital signal based on the list;
- playing muted audio;
- tuning to the particular DRB signal based on the tune command and performing digital signal acquisition of the particular DRB signal;
- muting digital audio to produce muted digital audio after acquisition of the digital signal of the particular DRB signal, and causing a blend multiplexer to select the muted digital audio for playback; and
- unmuting the digital audio recovered from the particular DRB signal after digital signal acquisition is complete, and switching from playing muted audio to playing digital audio selected by the blend multiplexer for playback.

2. The method of claim 1, wherein one of the DRB signals includes data that conveys the list and acquiring the list includes recovering the list from the one of the DRB signals.

3. The method of claim 1, wherein acquiring the list includes:
- establishing a wireless network connection to a data service;
- receiving, from the data service, data packets that include the list over the wireless network connection; and
- recovering the list from the data packets.

4. The method of claim 1, wherein acquiring the list includes:
- scanning the DRB signals to recover service modes of the DRB signals that are indicative of whether the DRB signals are the all-digital signals; and
- creating the list from the service modes.

5. The method of claim 1, wherein acquiring the list includes:

generating the list, over time, as a history of all-digital DRB signals to which the radio receiver has tuned and acquired digitally.

6. The method of claim 1, further comprising, upon determining that the particular DRB signal is not an all-digital signal:

tuning to the particular DRB signal, performing analog demodulation of the particular DRB signal to recover analog audio from an analog signal of the particular DRB signal, playing the analog audio, and performing the digital signal acquisition on the particular DRB signal; and when the digital signal acquisition is complete, performing the digital demodulation of the particular DRB signal to recover digital audio, and switching from playing the analog audio to playing digital audio.

7. The method of claim 6, wherein the particular DRB signal is a hybrid signal.

8. The method of claim 7, wherein the hybrid signal is an in-band on-channel (IBOC) radio broadcast signal that includes digitally modulated carriers and an analog carrier.

9. The method of claim 1, wherein the particular DRB signal is an in-band on-channel (IBOC) radio broadcast signal with no analog carrier.

10. The method of claim 1, wherein the list includes, for each DRB signal, a channel frequency, and an indication of whether each said DRB signal is all-digital.

11. An apparatus comprising:

a digital radio receiver to receive and process radio broadcast signals; and a controller to control the digital radio receiver and configured to:

acquire a list identifying which of the radio broadcast signals are all-digital signals and which of the radio broadcast signals are hybrid signals;

receive input to tune to a particular radio broadcast signal among the radio broadcast signals; and determining that the particular radio broadcast signal is an all-digital signal based on the list, controlling the digital radio receiver to:

play muted audio;

while playing muted audio, tune to the particular radio broadcast signal and performing digital signal acquisition of the particular radio broadcast signal;

while performing digital signal acquisition of the particular DRB signal, mute digital audio to produce muted digital audio, and causing a blend multiplexer to select the muted digital audio for playback; and unmute the digital audio recovered from the particular DRB signal after digital signal acquisition is complete, and switching from playing muted audio to playing digital audio while the blend multiplexer continues to select the digital audio for playback.

12. The apparatus of claim 11, wherein one of the radio broadcast signals includes data that conveys the list, and wherein the digital radio receiver is configured to perform recovering the list from the one of the radio broadcast signals, and providing the list to the controller.

13. The apparatus of claim 11, further comprising a network radio to perform:

establishing a wireless network connection to a data service;

receiving, from the data service, data packets that include the list over the wireless network connection; and providing the data packets to the controller, wherein the controller is configured to perform recovering the list from the data packets.

14. The apparatus of claim 11, wherein:

the digital radio receiver includes a scanning digital radio receiver configured to perform scanning the radio broadcast signals to recover service modes of the radio broadcast signals that are indicative of whether the radio broadcast signals are the all-digital signals; and the controller is configured to perform creating the list based on the service modes.

15. The apparatus of claim 11, wherein the controller is further configured to perform, upon determining that the particular radio broadcast signal is a hybrid signal based on the list, controlling the digital radio receiver to perform:

tuning to the particular radio broadcast signal, performing analog demodulation of the particular radio broadcast signal to recover analog audio from the hybrid signal, playing the analog audio, and performing the digital signal acquisition on the particular radio broadcast signal; and when the digital signal acquisition is complete, performing the digital demodulation of the particular radio broadcast signal to recover digital audio, and switching from playing the analog audio to playing digital audio.

16. The apparatus of claim 15, wherein the hybrid signal is an in-band on-channel (IBOC) radio broadcast signal that includes digitally modulated carriers and an analog carrier.

17. The apparatus of claim 15, wherein the digital radio receiver includes a digital radio demodulator and an analog demodulator.

18. The apparatus of claim 11, wherein the particular radio broadcast signal is an in-band on-channel (IBOC) radio broadcast signal with no analog carrier.

19. A non-transitory computer readable medium encoded with instructions that, when executed by a processor of a digital radio receiver configured to receive and process digital radio broadcast (DRB) signals, cause the processor to perform:

acquiring a list identifying which of the DRB signals are all-digital signals;

receiving input to tune to a particular DRB signal among the DRB signals;

performing digital signal acquisition of the particular DRB signal, muting digital audio to produce muted digital audio based upon acquisition of the digital signal of the particular DRB signal, and causing a blend multiplexer to select the muted digital audio for playback; and determining that the particular DRB signal is an all-digital signal based on the list, controlling the digital radio receiver to perform:

playing muted audio;

tuning to the particular DRB signal and performing digital signal acquisition of the particular DRB signal; and unmuting the digital audio recovered from the particular DRB signal after digital signal acquisition is complete, and switching from playing muted audio to playing digital audio selected by the blend multiplexer for playback.

20. The non-transitory computer readable medium of claim 19, wherein the particular DRB signal is an in-band on-channel (IBOC) radio broadcast signal with no analog carrier.

* * * * *